US010843779B2

(12) United States Patent
Roger (10) Patent No.: US 10,843,779 B2
(45) Date of Patent: Nov. 24, 2020

(54) PADDLE ASSEMBLY COMPRISING A PADDLE AND A REMOVABLE BLADE (71) Applicant: Donatien Roger, Rouen (FR)

(72) Inventor: Donatien Roger, Rouen (FR)

(*) Notice: Subject to any disclaimer, the term of this patent is extended or adjusted under 35 U.S.C. 154(b) by 0 days.

(21) Appl. No.: 16/304,575

(22) PCT Filed: May 26, 2017

(86) PCT No.: PCT/FR2017/051318
§ 371 (c)(1),
(2) Date: Nov. 26, 2018

(87) PCT Pub. No.: WO2017/203189
PCT Pub. Date: Nov. 30, 2017

(65) Prior Publication Data
US 2019/0291837 A1 Sep. 26, 2019

(30) Foreign Application Priority Data
May 27, 2016 (FR) .................................... 16 54826

(51) Int. Cl.
*B63H 16/04* (2006.01)
*F16B 5/06* (2006.01)
*B63B 34/26* (2020.01)
*A63B 35/06* (2006.01)

(52) U.S. Cl.
CPC ............. *B63H 16/04* (2013.01); *A63B 35/06* (2013.01); *B63B 34/26* (2020.02); *F16B 5/0685* (2013.01)

(58) Field of Classification Search
CPC ....... B63H 16/04; F16B 5/0685; A63B 35/06; B63B 34/26

USPC .......................................................... 416/74
See application file for complete search history.

(56) References Cited

U.S. PATENT DOCUMENTS

| 8,100,733 B1 | 1/2012 | Ross et al. |
| 8,926,384 B1 | 1/2015 | Alphin |
| 9,655,459 B1* | 5/2017 | Peng ..................... A47F 7/0021 |
| 2011/0011432 A1* | 1/2011 | Yakos ..................... A45B 5/00 135/66 |

(Continued)

FOREIGN PATENT DOCUMENTS

| WO | 2013/121120 A1 | 8/2013 |
| WO | 2015/077450 A1 | 5/2015 |
| WO | 2016/156274 A1 | 10/2016 |

OTHER PUBLICATIONS

French Search Report, dated Jan. 12, 2017, from corresponding FR application No. 1654826.

(Continued)

*Primary Examiner* — Courtney D Heinle
*Assistant Examiner* — Michael K. Reitz
(74) *Attorney, Agent, or Firm* — Nixon & Vanderhye (57) ABSTRACT A paddle assembly includes a paddle with a handle having a fixed blade attached at one end and a grip member attached at the opposite end, a removable blade and attachment unit configured to removably attach the removable blade to the paddle, such that the paddle assembly is able to take on a first, double-paddle configuration when the removable blade is attached to the end of the handle on the grip member side, or a second, single-paddle configuration when the removable blade is attached to the end of the handle on the fixed blade side and against the fixed blade.

20 Claims, 7 Drawing Sheets (56) References Cited

U.S. PATENT DOCUMENTS

2011/0027101 A1* 2/2011 Hartman ................ B63H 16/04
416/70 R

OTHER PUBLICATIONS

International Search Report, dated Oct. 12, 2017, from corresponding PCT application No. PCT/FR2017/051318.

* cited by examiner

PADDLE ASSEMBLY COMPRISING A PADDLE AND A REMOVABLE BLADE

BACKGROUND OF THE INVENTION

Field of the Invention

The present invention relates to the field of paddles, and in particular relates to a paddle assembly comprising a paddle and a removable blade, in particular for stand up paddle boarding.

Description of the Related Art

Stand up paddle boarding, also called SUP or paddle surfing, is a water gliding sport in which the practitioner stands on a board longer than a traditional surfboard, propelling himself using a paddle.

When a beginner learns to paddle with a standup paddle board, he discovers that the board tends to turn from the side opposite where he paddles. This phenomenon, called row effect, is more or less pronounced. It is even more pronounced when the board is short. This requires changing sides to paddle on the other side, in order to counter the row effect. A beginner may become discouraged if the row effect is too pronounced.

Furthermore, as the name indicates, stand up paddle boarding is done in the standing position. It can be restful and relaxing to paddle in the seated position, like with a kayak. In this case, it is essential to have a double paddle, otherwise the single standup paddle is tiresome and bulky, since it is too long if one is seated on the board.

Lastly, if stand up paddle boarding is done on waves, if the breaking waves are powerful and/or if the wind is strong, it may become very difficult to "pass the bar", in other words to head out into the open water, past the breaking point of the waves. There are different types of wave spots. Reefs, or point breaks spot types, which can be found in the islands, often allow a surfer or SUPer (i.e., a standup paddle boarder) to go around the waves on the side. Conversely, waves that are generated by the wind, while the wind is blowing at minimum at force 4 toward the beach (onshore wind conditions) being very frequent in the Channel or the Atlantic are generally very difficult breaking waves to pass, especially for a SUPer. Experienced surfers use the "duck" technique to dive under the wave before it crashes over them, but this technique is impossible for a SUP and a standing practitioner. As a result, most standup paddle boarders who wish to practice on waves cannot practice their sport if the breaking waves and the wind are too strong, which nevertheless is the case quite often. It should be noted that if the wind is offshore, i.e., if it is blowing from land, passing the bar will be easier with the single paddle, since the wind will push the SUPer out to sea and will implicitly help the SUPer pass the bars. In all other wind orientations, passing the bar will be even more complicated as the wind becomes stronger.

It should be noted that kayakers, in particular those involved in wave ski (surf kayaking for the waves), are capable of taking on very large waves (sometimes up to 3 meters), since they can paddle more strongly than a SUPer, thanks to a double paddle. The large majority of SUPers, even very experienced ones, are incapable of passing a breaking wave of more than 1.50 m. Yet the higher the waves are, the more interesting the conditions are for surfing by standup paddle boarding. For practitioners who have not perfectly mastered simple paddle boarding technique with a standup paddle board, it may be interesting to use the board as a kayak on which they sit to paddle with a double paddle. They will have no problem balancing and may be able to learn to take the waves seated.

Very large double paddles exist for standup paddle boarding, in order to be able to paddle while standing. However, these existing double paddles cannot be transformed into single paddles once the bar has been passed.

Furthermore, double paddles also exist that can be disassembled into 2 or even 3 parts, for kayaking. These double paddles can be disassembled to make them easier to store. However, it is not provided to use them once one of the parts is disassembled, since the grip member at the opposite end of the blade, which makes it possible to orient the paddle appropriately, would be missing.

A separable double paddle also exists, provided with a grip member at one of the blades, the grip member being fastened in the extension of the handle of the paddle, inside one of the blades. However, the drawback of this paddle is that it must necessarily be used with both blades, even if it is used as a single paddle while holding the grip member. The grip member of this paddle being placed in one of the blades, the clamping of the grip member is below the end of the blade in the vertical usage direction as a single paddle, and there is a very high risk of injury with the end of the blade bearing the grip member at face level. It is therefore necessary to be able to disassemble the blade to avoid injury, and in particular at the top of the body in the waves in case of fall.

Lastly, a double paddle exists, one of the blades of which is hollowed out to form a grip member. However, the drawback of this double paddle, once again, lies in the bulk and the risk of injuring oneself with the edge of the blade when paddling while standing in the single-paddle configuration. Furthermore, it is not possible with this paddle to remove one of the blades. Furthermore, the blade with the hollow grip member is too small, and its total length is too small to be truly able to provide an asset to pass the breaking waves.

BRIEF SUMMARY OF THE INVENTION

The present invention aims to resolve the drawbacks of the state of the art, by proposing a paddle assembly comprising a single paddle and a removable blade, the removable blade being configured to be fastened on the grip member end of the single paddle, generally usable for standup paddle boarding, in order to convert the single paddle into a double paddle, for example of the kayak paddle type, which makes it possible to create more rowing power to be able to pass bars. The removable blade is also configured to be attached against the blade of the single paddle in order to use the paddle assembly in the single-paddle configuration, which makes it possible to store the removable blade when the paddle assembly is not used in the double-paddle configuration and thus to avoid risks of injury with the edge of the removable blade or loss of the removable blade.

The present invention therefore relates to a paddle assembly comprising a paddle, said paddle comprising a handle, at one end of which a fixed blade is attached and at the opposite end of which a grip member is attached, characterized in that the paddle assembly further comprises a removable blade and attachment means configured to removably attach the removable blade to the paddle on one of the end of the handle on the grip member side and the end of the handle on the fixed blade side, such that the paddle assembly is able to adopt a first double-paddle configuration when the removable blade is attached to the end of the handle on the grip member side, or a second single-paddle configuration when the removable blade is attached to the end of the handle on the fixed blade side against the fixed blade.

Thus, in the double-paddle configuration, the removable blade extends past the grip member, the removable blade being attached removably on the handle of the paddle and/or directly on the grip member of the paddle, which allows the standup paddle boarder to use the paddle assembly in the double-paddle configuration, seated or on his knees on the board, to be able to pass the bar more easily, the rowing rhythm being faster with a double paddle than with a single paddle.

It should be noted that, in the double-paddle configuration, the fixed blade and the removable blade are preferably in the same plane, but could also form an angle between them around the handle, in order to improve the air penetration of the blade that is in the air.

Once the standup paddle boarder has passed the bar, he can remove the removable blade from the grip member end of the paddle and next attach the removable blade on the fixed blade end of the paddle in order to use the paddle assembly in the single-paddle configuration, the removable blade being arranged against the fixed blade and removably attached to the handle of the paddle and/or directly on the fixed blade of the paddle, which makes it possible to store the removable blade when the paddle assembly is not used in the double-paddle configuration and thus on the one hand to avoid risks of injury with the edge of the removable paddle and hinder use of the single paddle, and on the other hand loss of the removable blade.

The attachment means are arranged on the paddle, namely at least one from among the handle, the grip member and the fixed blade, and/or on the removable blade, said attachment means making it possible to attach the removable blade on one or the other of the ends of the handle of the paddle quickly and removably, depending on the configuration used.

It is essential for the removable blade to be able to be attached or detached very quickly. Indeed, a standup paddle boarder may be led to attach and detach the removable blade a certain number of times per session, a session being the term used to refer to an outing at sea during which a gliding sport is practiced. In particular, if the breaking waves are too difficult to pass with the paddle assembly in the single-paddle configuration, the practitioner may install the removable blade on the grip member end of the paddle to pass the breaking waves, in order to paddle with both blades. However, once the bar is passed, it may be of interest to detach the removable blade from the grip member end of the paddle and to use the paddle assembly in the single-paddle configuration to take advantage of the single paddle to surf.

The handle of the paddle preferably has a circular cross-section. However, the parts of the handle of the paddle that are configured to receive the removable blade may also be square or have at least one planar part, to prevent the removable blade from risking rotating around the axis of the handle of the paddle when it is attached thereto.

The paddle and the removable blade are preferably made from carbon fiber such that the total weight of the paddle assembly remains reasonable, but could also be made from fiberglass, poly(p-phenyleneterephthalamide) (PPD-T, marketed under the registered trademark Kevlar®), a combination thereof (for example, carbon and fiberglass), plastic such as polyamide, or wood, without departing from the scope of the present invention.

When the removable blade is superimposed on the fixed blade, this for example adds about 200 grams to the end of the handle of the single paddle. This small excess weight is not bothersome, and is even advantageous. Indeed, it adds stability, by balancing effect (like a tightrope pole), when the practitioner waits upright for a wave, in particular when the body of water is difficult and choppy, which occurs when the body of water is windy and the sea is agitated.

It should be noted that, when the paddle assembly is not used in the double-paddle configuration, the removable blade could also be attached on the front of the standup paddle board using a quick fastener, the removable blade could also be housed in a pouch, a net, a hatch or a fitting system arranged on the standup paddle board, or the removable blade could also be housed in a backpack worn by the practitioner such as a backpack made up of a net for discharging water quickly, without departing from the scope of the present invention.

According to one particular feature of the invention, in the second configuration, the pressure face or concave side of the removable blade is arranged against the suction face or convex side of the fixed blade, the shape of which it follows closely.

Thus, the fixed blade and the removable blade arranged on one another form the only blade of the paddle assembly in the single-paddle configuration, the removable blade being the counter-shape of the fixed blade.

According to one particular feature of the invention, in the second configuration, the convex side of the removable blade is arranged against the concave side of the fixed blade, the shape of which it follows closely.

Thus, the fixed blade and the removable blade arranged on one another form the only blade of the paddle assembly in the single-paddle configuration, the removable blade being the counter-shape of the fixed blade.

It should be noted that, in one preferred embodiment of the invention, the concave side of the removable blade will be arranged against the convex side of the fixed blade.

The thicknesses of the fixed and removable blades are preferably reduced relative to conventional blades, such that the sole blade of the paddle assembly in the single-paddle configuration, made up of the fixed and removable blades arranged on one another, has a conventional blade thickness.

The end of the removable blade opposite the end fixed on the paddle is preferably slightly curved toward the fixed blade in the double-paddle configuration, such that, when the removable blade is in position on the fixed blade, the elasticity of the carbon fiber presses said end of the removable blade perfectly on the fixed blade.

According to one particular feature of the invention, the attachment means comprise at least one fastener comprising a coupling element with at least one notch, a clamping lever comprising a hook, and a clamping cable connecting the coupling element and the clamping lever, the coupling element being attached on one of the removable blade and the handle of the paddle, the clamping lever being configured to be forcibly folded down against the handle of the paddle once the clamping cable surrounds the other of the removable blade and the handle of the paddle and the hook of the clamping lever is inserted into one of the at least one notch of the coupling element.

Thus, this fastener of the ski shoe attachment or spring clip type makes it possible to attach the removable blade quickly and removably on one or the other of the ends of the handle of the paddle depending on the configuration used.

It should be noted that, when the fasteners are attached on the handle of the paddle, at least one fastener is attached at each end of the handle of the paddle.

According to one particular feature of the invention, the attachment means comprise at least one attachment strip of the loop and hook type arranged on one of the removable blade and the handle of the paddle.

Thus, this attachment strip of the loop and hook type, such as a Velcro® strip, makes it possible to attach the removable blade quickly and removably on one or the other of the ends of the handle of the paddle depending on the configuration used, the loops and hooks of said attachment strip gripping one another once the attachment strip surrounds the handle of the paddle and the removable blade.

It should be noted that, when the attachment strips are attached on the handle of the paddle, at least one attachment strip is attached at each end of the handle of the paddle.

According to one particular feature of the invention, the handle of the paddle is hollow and the attachment means comprise at least one spring leaf arranged in the handle of the paddle and both ends of which respectively bear two pins arranged to protrude from two holes formed in the handle of the paddle and diametrically opposite, the two pins thus forming two pushbuttons, the removable blade comprising two through holes configured to receive the two pushbuttons in order to attach the removable blade on the handle of the paddle.

Thus, the standup paddle boarder can attach the removable blade on the handle of the paddle by pressing the two pushbuttons while arranging the two holes of the removable blade opposite the two holes of the handle of the paddle, then releasing the two pushbuttons such that the two pushbuttons protrude from the two holes of the removable blade.

Likewise, the practitioner can detach the removable blade by pressing the two pushbuttons, then removing the removable blade.

According to one particular feature of the invention, the attachment means comprise at least one coupling element arranged through the thickness of the removable blade or attached thereon and configured to be coupled with a complementary element arranged on the paddle.

Thus, the coupling of the coupling element with the complementary element, for example by fitting, screwing and/or locking, makes it possible to attach the removable blade on the paddle.

The complementary element may for example be a plate attached to the fixed blade and on which a disc fits arranged in the thickness of the removable blade as coupling element, said disc being attached to said plate by rotation of the disc over a half-revolution, this type of attachment being similar to an plate-type attachment of snowboard.

The complementary element can be arranged on the fixed blade, the handle and/or the grip member of the paddle.

According to one particular feature of the invention, the at least one coupling element is a screw or a button with a threaded rod and the complementary element is a tapped hole.

Thus, the screwing of the screw or the threaded rod of the button with threaded rod through the thickness of the removable blade, then in the tapped hole of the paddle makes it possible to attach the removable blade to the paddle.

According to one particular feature of the invention, the attachment means comprises at least one quick clamping lever arranged on the handle of the paddle and configured to be inserted into a notch formed in the removable blade, then to be clamped in order to attach the removable blade to the handle of the paddle.

Thus, once the quick clamping lever has been inserted into the notch of the removable blade, then clamped, the quick clamping lever makes it possible to attach the removable blade on the handle of the paddle.

The quick clamping lever could also, without departing from the scope of the present invention, be secured to the removable blade, for attachment to the handle of the paddle and/or in the upper part (base in contact with the handle) of the fixed blade.

It should be noted that the attachment means could also be formed by fitting in the handle or around the handle, the maintenance in place of the removable blade being provided by one from among a sliding sleeve, a rotating sleeve, a ring, a push element and a resilient system, without departing from the scope of the present invention.

The attachment means can also be formed by fitting of the bayonet type on the handle, such as fitting equivalent to a bayonet mount of a light bulb, by rotation, without departing from the scope of the present invention.

The attachment means may advantageously be covered in whole or in part with foam in order to prevent damaging the SUP board when the paddle is used, the attachment means indeed being likely to damage the board when the paddle is plunged into the water, then removed from the water to propel the SUP board.

According to one particular feature of the invention, the attachment means comprise at least one quick fastener secured to a rod, the end of which bears a catching means, a hole being formed in the removable blade, and a hole being formed below the grip and in the fixed blade in order to attach the removable blade to one of the grip or the fixed blade by passing the rod in the holes, and clamping of the quick fastener with the catching means, which cooperate with one of the grip or the fixed blade.

The catching means can be a nut cooperating with a threaded end of the rod, in which case the holes formed in the handle and the fixed blade have the same section as the rod, or can be a stop, forming a T with the rod, the holes formed in the handle and the fixed blade then being longitudinal to allow the passage of the stop, which is next rotated by 90° to secure the removable blade with one of the handle and the fixed blade, after clamping of the quick fastener. The catching means could also be a bayonet.

The attachment means could also be made up by fitting of the bayonet type in the handle, such as by fitting according to a system equivalent to the bayonet fittings for light bulbs, by rotation, without departing from the scope of the present invention.

According to one particular feature of the invention, the attachment means comprise at least one protrusion arranged in one of the removable blade and the paddle and configured to fit in at least one complementary recess arranged on the other of the removable blade and the paddle.

Thus, the fitting of the protrusion in the complementary recess makes it possible to keep the removable blade in position before attaching the latter on the paddle, which decreases the movement play of the removable blade once attached.

According to one particular feature of the invention, the at least one protrusion is at least one needle configured to fit in the at least one complementary recess.

Thus, two needles may for example be arranged on the removable blade and configured to fit in two complementary recesses arranged on the handle of the paddle.

According to one particular feature of the invention, the at least one protrusion is at least one groove and the at least one complementary recess is at least one slit with a shape complementary to the at least one groove.

Thus, at least one groove may for example be arranged on the removable blade and configured to fit in at least one complementary slit arranged on the fixed blade of the paddle in the double-paddle configuration, which makes it possible to wedge the removable blade and keep it in position against the fixed blade of the paddle.

Furthermore, the at least one groove makes it possible to stiffen the removable blade in order to prevent it from deforming when the practitioner paddles.

The at least one groove and the at least one complementary slit are optional, but are useful to wedge the removable blade well on the fixed blade and to impart the rigidity to the removable blade, which may therefore be thinner than if it did not have grooves or ribs.

It should be noted that the attachment means preferably comprise several grooves and several complementary slits in order to better wedge the removable blade on the fixed blade.

According to one particular feature of the invention, the end of the removable blade intended to be fixed on the handle of the paddle is elongate and has a shape complementary to a recess formed on the handle of the paddle, such that, when the removable blade is attached on the paddle, the handle has a substantially constant section between its two ends.

Said elongate end of the removable blade and the part of the handle on which the latter is attached preferably have semi-cylindrical shapes, such that, when the removable blade is attached on the handle of the paddle, the handle of the paddle has a substantially constant section with a circular shape between its two ends.

It should be noted that the elongate end of the removable blade could also have a semi-cylindrical hollow shape configured to fit on the handle of the paddle, said elongate end having an angle of about 10° relative to the longitudinal axis of the removable blade, such that, in the double-paddle configuration, the practitioner can place his hand between the removable blade and the grip member so as to paddle in the standing position while holding the grip member even if the removable blade is not disassembled and attached on the fixed blade.

Furthermore, it should be noted that the removable blade may not comprise an elongate end and could, in the double-paddle configuration, be attached directly on the grip member of the paddle, the removable blade thus being shorter.

According to one specific feature of the invention, the handle of the paddle is adjustable in terms of height.

Thus, the stand up paddle boarder can adjust the paddle to his height and his boarding style, for example racing, surfing or touring. This height adjustment is optional, but appreciable.

The handle of the paddle then comprises a first hollow tube attached to the fixed blade and in which a second tube fixed to the grip member can slide in a telescoping manner, the second tube being locked in position by a quick clamping lever arranged on the first tube at the end opposite the fixed blade.

In this case, the removable blade is attached on the first tube and/or the fixed blade in the single-paddle configuration, and is attached on the second tube and/or the grip member in the double-paddle configuration.

The diameters of the first and second tubes being different in order to allow the second tube to slide in a telescoping manner in the first tube, the difference in diameter is compensated either by a rigid or resilient shim arranged at the grip member end of the second tube, or by a plastic part of the sleeve type that is common to the grip member end of the second tube and the fixed blade base of the first tube and/or has the same diameter.

It should be noted that, in the case of a ski shoe or spring clip fastener, the different notches of the coupling element make it possible to compensate the difference in diameter without needing a shim.

Furthermore, with the handle of the height-adjustable paddle, the practitioner can turn the tube of the handle comprising the grip member slightly such that the two blades are in the crossed position, i.e., in the kayak position, the two blades forming an angle relative to one another, making it possible to improve the air penetration of the blade that is in the air.

If the practitioner wishes to generate maximum power in the double-paddle configuration to pass the waves, he can take the two blades away maximally to reach a paddle length of about 2.40 to 2.50 m, or even more, to have greater leverage.

According to one particular feature of the invention, the paddle assembly further comprises a leash configured to connect the removable blade to the handle of the paddle, said leash being configured to slide along the handle of the paddle.

Thus, this leash makes it possible to connect the removable blade to the paddle at all times in order to avoid losing the removable blade when the latter is not attached on the paddle by the attachment means, for example when the practitioner releases the removable blade inadvertently in the middle of the water or when the practitioner falls when he is in the process of attaching/detaching the removable blade to/from the paddle.

The leash is connected to the removable blade via a hole in the removable blade in which the leash is inserted then attached, or by means of a protuberance on the removable blade, said protuberances comprising an orifice in which the leash is inserted, then attached.

The leash is preferably elastic so as to provide greater comfort for the practitioner when he attaches the removable blade on the paddle.

According to one particular feature of the invention, the removable blade and the fixed blade have one or several concavities in a direction perpendicular to their length direction, making it possible to stiffen the blade, decrease its thickness while having a gain in propulsion power.

According to one particular feature of the invention, the removable blade and the fixed blade have, for one of them, a concavity in a direction parallel to their length direction or a concavity in a direction perpendicular to their length direction.

Thus, this concavity allows the practitioner to have a better propulsion of the board when he rows using the paddle assembly in the double-paddle configuration.

According to one particular feature of the invention, the useful surface of the removable blade is smaller than or equal to the useful surface of the fixed blade.

The useful surface of the blade is defined as the surface intended to enter the water to allow the propulsion of the board.

According to one particular feature of the invention, the grip member is T-shaped, the shaft of which is secured to the handle of the paddle.

Thus, the T-shape of the grip member allows better gripping of the grip member by the stand up paddle boarder. The grip member may, however, assume other shapes, in particular a ball, without departing from the scope of the present invention.

It should be noted that the attachment means may also be covered with foam and/or a sleeve, such as neoprene, in order to damp the possible contact between the float of the board and the paddle. In case of a sleeve, the latter must be able to slide, so as to be able to attach or detach the attachment means.

BRIEF DESCRIPTION OF THE DRAWINGS

To better illustrate the subject matter of the present invention, below we will describe, by way of nonlimiting illustration, preferred embodiments, in reference to the appended drawings.

In these drawings.

DETAILED DESCRIPTION OF THE PREFERRED EMBODIMENTS

Figure 1:
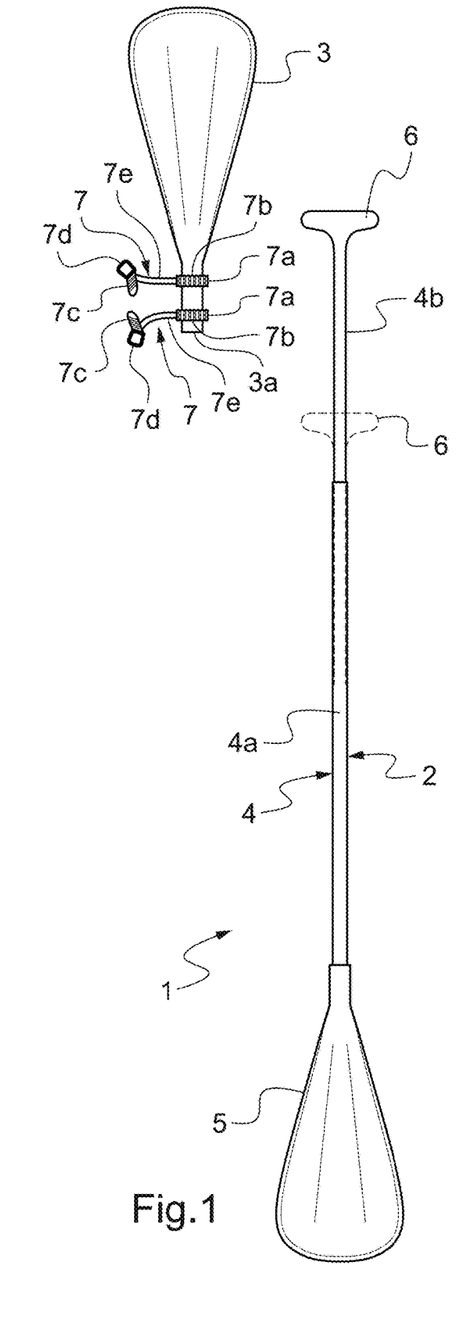
FIG. 1 is a front view of a paddle assembly according to a first embodiment of the present invention when the removable blade of the paddle assembly is not attached on the paddle of the paddle assembly.
Figures 2, 2A:
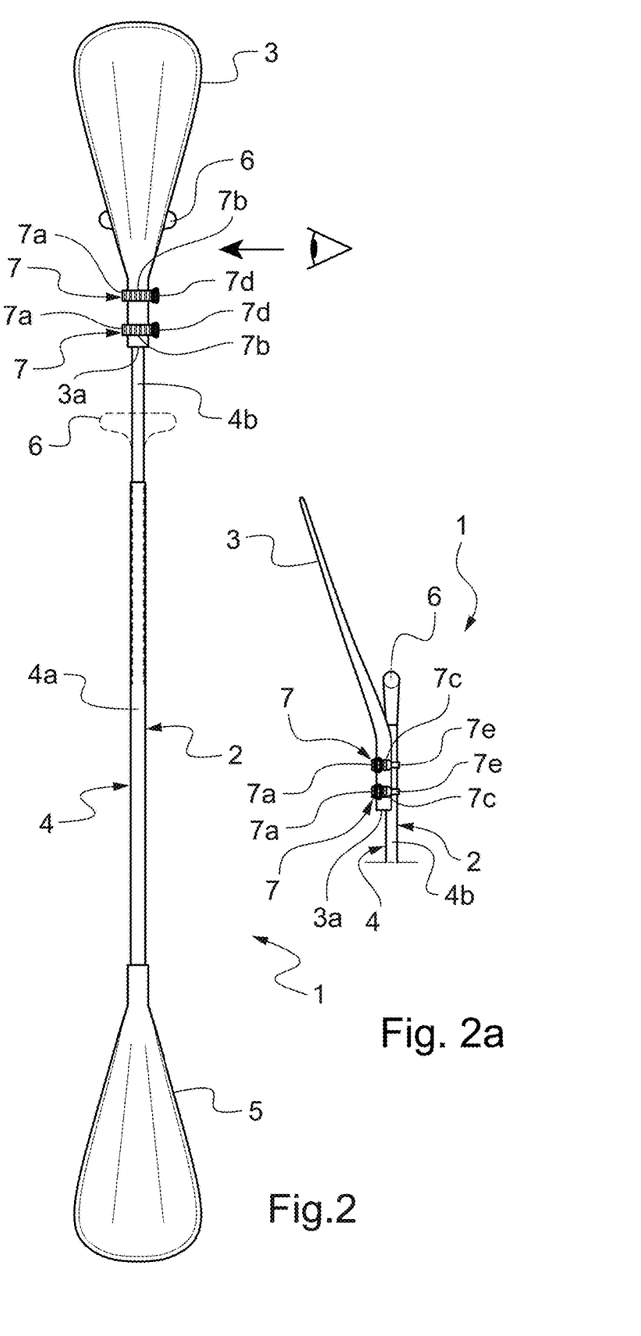
FIGS. 2 and 2a are a front view and a side view of the paddle assembly of FIG. 1 in the first double-paddle configuration.
Figure 3:
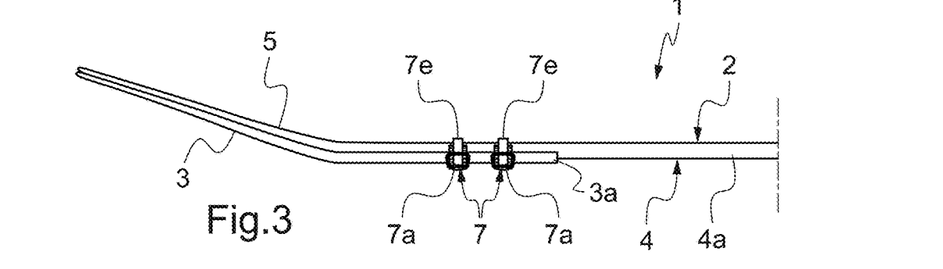
FIG. 3 is a side view of the paddle assembly of FIG. 1 in the second single-paddle configuration.

FIGS. 1, 2 and 3 show a paddle assembly 1 according to a first embodiment of the present invention.

The paddle assembly 1 comprises a paddle 2 and a removable blade 3.

The paddle 2 comprises a handle 4, at one end of which a fixed blade 5 is attached and at the opposite end of which a grip member 6 is attached.

The paddle 2 is a simple conventional stand up paddle board paddle.

The grip member 6 is in the shape of a T, the shaft of which is secured to the handle 4 of the paddle 2, the T shape of the grip member 6 allowing better gripping of the grip member by the stand up paddle boarder.

The handle 4 of the paddle 2 is adjustable in terms of height, which allows the stand up paddle boarder to adjust the paddle 2 to his height and his paddle boarding style.

The handle 4 of the paddle 2 thus comprises a first hollow tube 4a attached to the fixed blade 5 and in which a second tube 4b attached to the grip member 6 can slide, the second tube 4b being locked in position by a quick clamping lever (not shown in the Figures) arranged on the first tube 4a at its end opposite the fixed blade 5.

It should be noted that the handle 4 of the paddle 2 could also not be height-adjustable and include a single tube, without departing from the scope of the present invention.

The grip member 6 is shown, in FIGS. 1 and 2, in solid lines in its deployed position and in dotted lines in its retracted position.

The paddle assembly 1 further comprises attachment means configured to removably attach the removable blade 3 on the paddle 2 at one of the end of the handle 4 on the grip member 6 side and the end of the handle 4 on the fixed blade 5 side, such that the paddle assembly 1 is able to assume a first double-paddle configuration when the removable blade 3 is attached on the end of the handle 4 on the grip member 6 side or a second single-paddle configuration when the removable blade 3 is attached on the end of the handle 4 on the fixed blade 5 side against the fixed blade 5.

The attachment means comprise at least one fastener, the preferred quick fastener being of the sailboard wishbone fastener type that attaches the wishbone to the mast of the sailboard.

As shown in FIG. 2, in the double-paddle configuration, the removable blade 3 extends past the grip member 6, the removable blade 3 being attached removably on the second tube 4b of the handle 4 of the paddle 2, which allows the stand up paddle boarder to use the paddle assembly 1 in the double-paddle configuration, seated or on his knees on the stand up paddle board, so as to be able to pass the bar in the water more easily.

It should be noted that, in the double-paddle configuration, the fixed blade 5 and the removable blade 3 are in the same plane, due to the T shape of the grip member 6.

Once the stand up paddle boarder has passed the bar, he can remove the removable blade 3 from the grip member 6 end of the paddle 2 and next attach the removable blade 3 on the fixed blade 5 end of the paddle 2 in order to use the paddle assembly 1 in a single-paddle configuration, as shown in FIG. 3.

In the single-paddle configuration, the removable blade 3 is arranged against the fixed blade 5 and is removably attached to the first tube 4a of the handle 4 of the paddle 2, which makes it possible to store the removable blade 3 when the paddle assembly 1 is not used in the double-paddle configuration and thus to avoid risks of injury with the edge of the removable blade 3 or the loss of the removable blade 3.

The paddle 2 and the removable blade 3 are preferably made from carbon fiber such that the total weight of the paddle assembly 1 remains reasonable, but could also be made from fiberglass, poly(p-phenyleneterephthalamide) (PPD-T, marketed under the registered trademark Kevlar®), a combination thereof (for example, carbon and fiberglass), plastic such as polyamide, or wood, without departing from the scope of the present invention.

The end 3a of the removable blade 3 intended to be attached on the handle 4 of the paddle 2 is elongate and has a hollow semi-cylinder shape configured to fit on the handle 4 of the paddle 2.

The attachment means according to the first embodiment of the invention comprise two fasteners 7, each fastener 7 comprising a coupling element 7a with notches 7b, a clamping lever 7c comprising a hook 7d, and clamping cable 7e connecting the coupling member 7a and the clamping lever 7c, the coupling member 7a being attached on the elongate end 3a of the removable blade 3, the clamping lever 7c being configured to be forcibly folded down against the handle 4 of the paddle 2 once the clamping cable 7e surrounds the handle 4 of the paddle 2 and the hook 7d of the clamping lever 7c is inserted into one of the notches 7b of the coupling member 7a.

It should be noted that the attachment means can also comprise a single fastener or at least three fasteners, without departing from the scope of the present invention.

Furthermore, the coupling member 7a could also be attached on the handle 4 of the paddle 2, the clamping lever 7c being forcibly folded down once the clamping cable 7e surrounds the elongate end 3a of the removable blade 3, without departing from the scope of the present invention.

It should be noted that the attachment means can also comprise at least one fastening strip of the loop and hook type, such as Velcro®, arranged on one of the elongate ends 3a of the removable blade 3 and the handle 4 of the paddle 2, without departing from the scope of the present invention.

As shown in the view of FIG. 2a, the removable blade 3 has an angle of about 10° relative to the longitudinal axis of the elongate end 3a of the removable blade 3, such that, in the double-paddle configuration, the practitioner can place his hand between the removable blade 3 and the grip member 6 in order to paddle in the standing position while holding the grip member 6 even if the removable blade 3 is not disassembled and attached against the fixed blade 5.

As shown in FIG. 3, in the second single-paddle configuration, the concave side of the removable blade 3 is arranged against the convex side of the fixed blade 5, the shape of which it follows closely. Thus, the fixed blade 5 and the removable blade 3 arranged against one another form the single blade of the paddle assembly 1 in the single-paddle configuration, the removable blade 3 being the counter-shape of the fixed blade 5.

It should be noted that, in the second configuration, the convex side of the removable blade 3 could also be arranged against the concave side of the fixed blade 5, the shape of which it follows closely, without departing from the scope of the present invention.

The thicknesses of the fixed 5 and removable 3 blades are preferably reduced relative to conventional blades, such that the only blade of the paddle assembly 1 in the single-paddle configuration, made up of fixed 5 and removable 3 blades arranged on one another, has a conventional blade thickness.

The useful surface of the removable blade 3 could also be smaller than the useful surface of the fixed blade 5, without departing from the scope of the present invention.

It should be noted that the fasteners 7 could also be covered with foam and/or a sleeve, of the neoprene type, so as to damp the possible contact between the float of the stand up paddle board and the paddle 2.

Figures 4, 5:
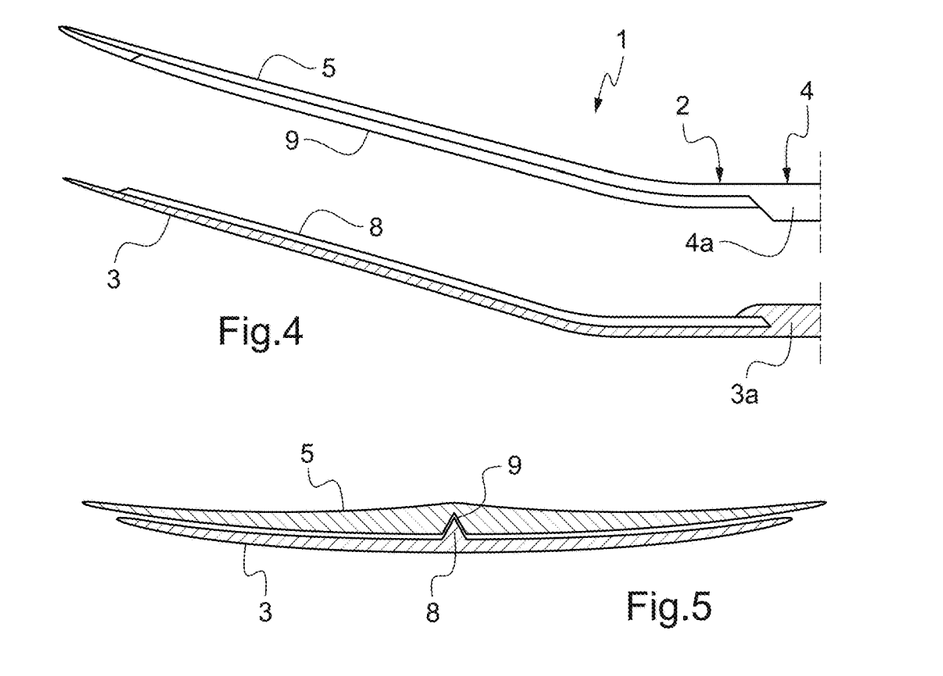
FIG. 4 is a longitudinal sectional view of the fixed blade and the removable blade of the paddle assembly of FIG. 1.
FIG. 5 is a cross-sectional view of the fixed blade and the removable blade of the paddle assembly of FIG. 1.

FIGS. 4 and 5 show the longitudinal sectional and cross-sectional views of removable 3 and fixed 5 blades of the paddle assembly 1 according to the first embodiment of the invention.

The concave side of the removable blade 3 includes a groove 8, and the convex side of the fixed blade 5 includes a complementary slit 9, the groove 8 being configured to fit in the complementary slit 9 in the single-paddle configuration of the paddle assembly 1, which makes it possible to wedge, and keep in position, the removable blade 3 against the fixed blade 5 of the paddle 2.

Furthermore, the groove 8 makes it possible to stiffen the removable blade 3 in order to prevent the latter from deforming when the practitioner paddles.

It should be noted that the convex side of the fixed blade 5 could also include a groove configured to fit in a complementary slit in the concave side of the removable blade 3, without departing from the scope of the present invention.

The removable blade 3 and the fixed blade 5 could also respectively include several grooves 8 and several complementary slits 9, without departing from the scope of the present invention.

The groove 8 and the complementary slit 9 could also respectively extend over the elongate end 3a of the removable blade 3 and the second tube 4a of the handle 4 of the paddle 2.

Figure 6:
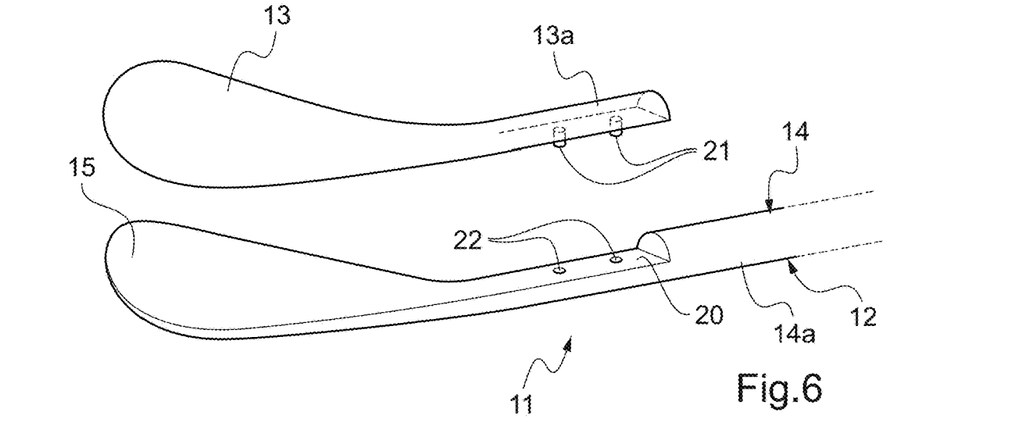
FIG. 6 is a perspective view of the fixed blade and the removable blade of the paddle assembly according to a second embodiment.

FIG. 6 shows a paddle assembly 11 according to a second embodiment of the invention.

The common elements between the first embodiment of the invention in FIGS. 1 to 5 and this second embodiment of the invention bear the same reference numerals increased by 10, and will not be described in more detail here when they have identical structures.

It should be noted that the fasteners, identical to the fasteners 7 of the first embodiment, attached on the elongate ends 13a of the removable blade 13, have not been shown in FIG. 6 so as not to overload the drawing in order to facilitate the reader's understanding.

According to this second embodiment, the elongate end 13a of the removable blade 13 has a solid semi-cylindrical shape complementary to a recess 20 formed on the handle 14 of the paddle 12, such that, when the removable blade 13 is attached on the paddle 12, the handle 14 has a substantially constant section between both of its ends.

The handle 14 thus has a recess 20 on the first tube 14a of the handle 14 on the fixed blade 15, as well as another recess on the second tube of the handle 14 on the grip member, each of the first 14a and second tubes of the handle 14 having a solid semi-cylindrical shape complementary to the elongate end 13a of the removable blade 13.

The elongate end 13a of the removable blade 13 has two needles 21 configured to fit in two complementary holes 22 formed on the handle 14 of the paddle 12 at the recess 20, which makes it possible to wedge the position of the removable blade 13 on the handle 14.

It should be noted that the elongate end 13a of the removable blade 13 could also comprise a single needle 21 or at least three needles 21, without departing from the scope of the present invention.

The handle 14 can also comprise at least one needle and the elongate end 13a of the removable blade 13 could comprise complementary holes, without departing from the scope of the present invention.

Figure 7:
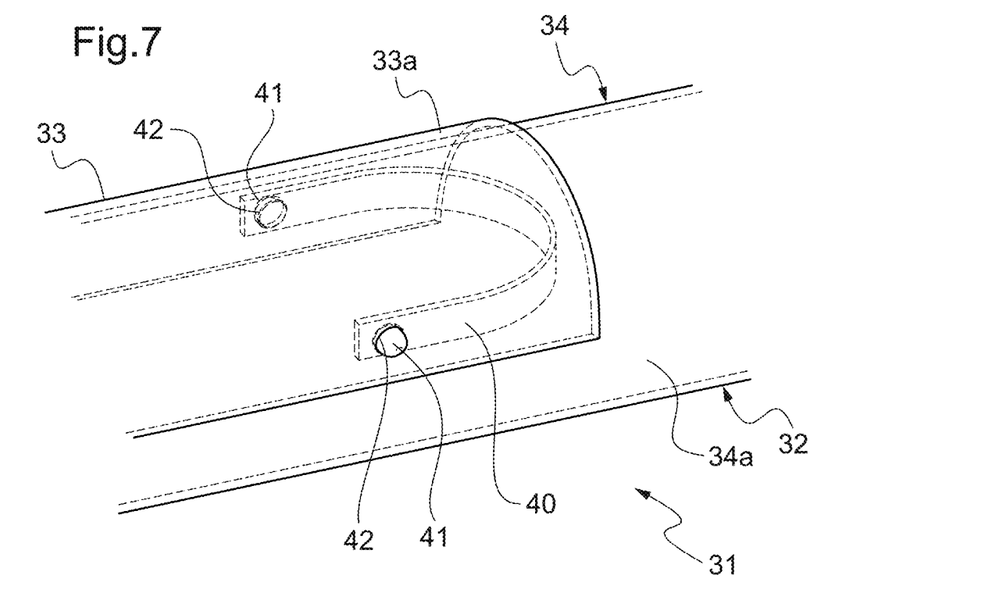
FIG. 7 is a perspective view of the removable blade and the handle of the paddle of the paddle assembly according to a third embodiment.

FIG. 7 shows a paddle assembly 31 according to a third embodiment of the invention.

The common elements between the first embodiment of the invention in FIGS. 1 to 5 and this third embodiment of the invention bear the same reference numerals, increased by 30, and will not be described in more detail here when they have identical structures.

According to this third embodiment, the handle 34 of the paddle 32 is hollow and the means for attaching the removable blade 33 on the paddle 32 are made up, in each of the first 34a and second tubes of the handle 34, of a spring leaf 40 curved along a U shape and arranged in the handle 34 of the paddle 32 and both ends of which respectively bear two pins 41 arranged to protrude from two through holes (not shown in FIG. 7 so as not to overload the drawing) formed in the handle 34 of the paddle 32 and which are diametrically opposite, the two pins 41 thus forming two pushbuttons.

The elongate end 33a, in the form of a hollow semi-cylinder, of the removable blade 33 comprises two through holes 42 configured to receive the two pushbuttons 41 so as to attach the removable blade 33 on the handle 34 of the paddle 32, and to be able to release it by simultaneously pressing on the pushbuttons.

Thus, the stand up paddle boarder can attach the removable blade 33 on the handle 34 of the paddle 32 by pressing the two pushbuttons 41 while arranging the two holes 42 of the elongate end 33a of the removable blade 33 across from the two holes of the handle 34 of the paddle 32, then releasing the two pushbuttons 41 such that the two pushbuttons 41 protrude from the two holes 42 of the removable blade 33.

Likewise, the practitioner can detach the removable blade 33 from the handle 34 by pressing on the two pushbuttons 41, then removing the removable blade 33.

Figure 8:
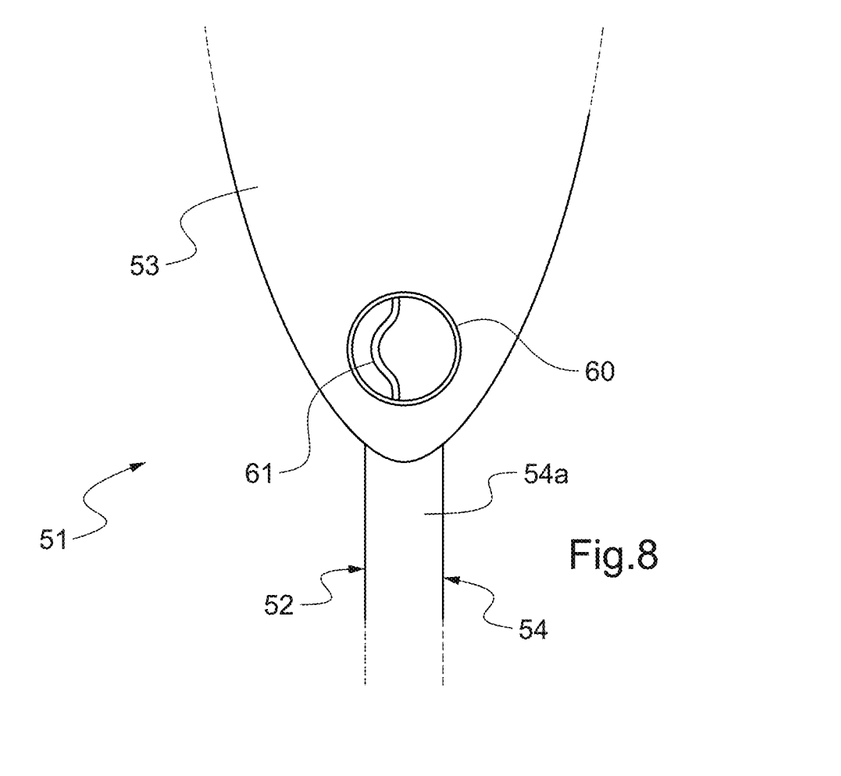
FIG. 8 is a front view of the removable blade and the handle of the paddle of the paddle assembly according to a fourth embodiment.

FIG. 8 shows a paddle assembly 51 according to a fourth embodiment of the invention.

The common elements between the first embodiment of the invention in FIGS. 1 to 5 and this fourth embodiment of the invention bear the same reference numerals increased by 50, and will not be described in more detail here when they have identical structures.

According to this fourth embodiment, the removable blade 53 does not comprise an elongate end and is attached directly on the fixed blade in the double-paddle configuration and on the grip member in the single-paddle configuration.

Furthermore, in this fourth embodiment, the attachment means are formed by a coupling member 60 arranged through the thickness of the removable blade 53 and configured to be coupled with a complementary element (not shown in FIG. 8) arranged on the fixed blade and the grip member.

The complementary element is a plate and the coupling member 60 is a disc attached in rotation in the thickness of the removable blade 53, the disc 60 comprising a grip member 61 and being configured to fit in the plate during a rotation by a half-revolution of the disc 60 using the grip member 61, this type of attachment being similar to an attachment with snowboard plates.

It should be noted that the coupling member 60 could also be a screw or a button with a threaded rod and the complementary member could be a complementary tapped hole, the screwing of the screw or the threaded rod of the button with threaded rod through the thickness of the removable blade 53, then into the tapped hole of the paddle 52 making it possible to attach the removable blade 53 on the paddle 52, without departing from the scope of the present invention.

Figure 9:
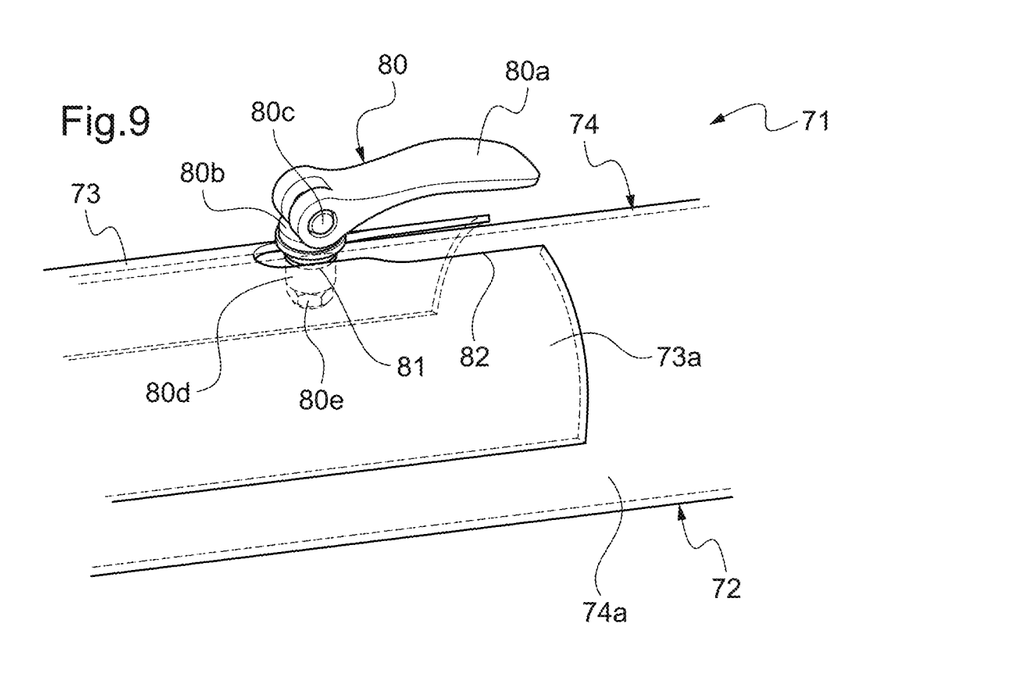
FIG. 9 is a perspective view of the removable blade and the handle of the paddle of the paddle assembly according to a fifth embodiment.

FIG. 9 shows a paddle assembly 71 according to a fifth embodiment of the invention.

The common elements between the first embodiment of the invention in FIGS. 1 to 5 and this fifth embodiment of the invention bear the same reference numerals increased by 70, and will not be described in more detail when they have identical structures.

According to this fifth embodiment, the handle 74 of the paddle 72 is hollow and the attachment means are made up of a quick clamping lever 80 arranged on each of the first 74a and second tubes of the handle 74 of the paddle 72.

The quick clamping lever 80 comprises a clamping handle 80a connected to a washer 80b via a rotation axle 80c.

The quick clamping lever 80 further comprises an elastomer spring 80d arranged below the washer 80b and maintained by a nut 80e, the elastomer spring 80d being inserted into a hole 81 formed on the handle 74, the washer 80b being arranged above the hole 81 and the diameter of the washer 80b being greater than that of the hole 81.

Under the action of the clamping grip member 80a, the elastomer spring 80d becomes crushed and presses the washer 80b against the handle 74 of the paddle 72.

The elongate end 73a of the removable blade 73 has a flared notch 82 in which the quick clamping lever 80 can be inserted, when the clamping grip member 80a is loosened, the edges of the flared notch 82 being arranged between the washer 80b of the quick clamping lever 80 and the handle 74 of the paddle 72.

The clamping of the clamping grip member 80a makes it possible to push the washer 80b against the edges of the flared notch 82 in order to lock the removable blade 73 against the handle 74 of the paddle 72.

It should be noted that the means for attaching the removable blade 73 on the paddle 72 could also be formed by fitting in the handle 74 or around the handle 74, the maintenance in place of the removable blade 73 being provided by one from among a sliding sleeve, a rotating sleeve, a ring, a plunger and a resilient system, without departing from the scope of the present invention.

The attachment means can also be formed by fitting of the bayonet type in the handle 74, without departing from the scope of the present invention.

Figure 10:
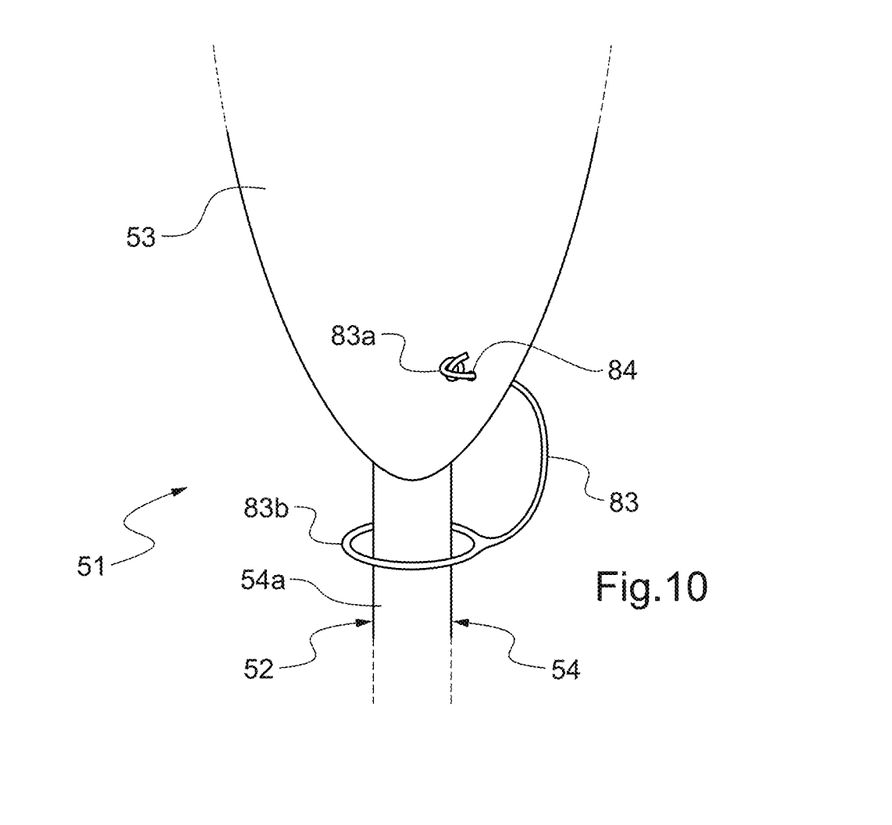
FIG. 10 is a front view of the paddle assembly according to an alternative embodiment of the present invention.

FIG. 10 shows an alternative embodiment of the paddle assembly 51 according to the fourth embodiment of the invention.

It should be noted that the coupling member 60 according to the fourth embodiment has not been shown in FIG. 10 so as not to overload the drawing.

The paddle assembly 51 further comprises a leash 83 configured to connect the removable blade 53 to the handle 54 of the paddle 52.

The removable blade 53 comprises a hole 84 in which a first end of the leash 83 is inserted, on which a knot 83a is made.

The second end of the leash 83 comprises a loop 83b arranged around the handle 54 of the paddle 52, such that the leash 83 is configured to slide along the handle 54 of the paddle 52.

The leash 83 makes it possible always to connect the removable blade 53 to the paddle 52 so as to avoid losing the removable blade 53 when the latter is not attached on the paddle 52.

It should be noted that the first end 83a of the leash 83 could also be inserted into an orifice of a protuberance formed on the removable blade 53, without departing from the scope of the present invention.

The leash 83 is preferably made from a resilient material so as to provide greater comfort to the practitioner when he attaches the removable blade 53 on the paddle 52.

Figure 11:
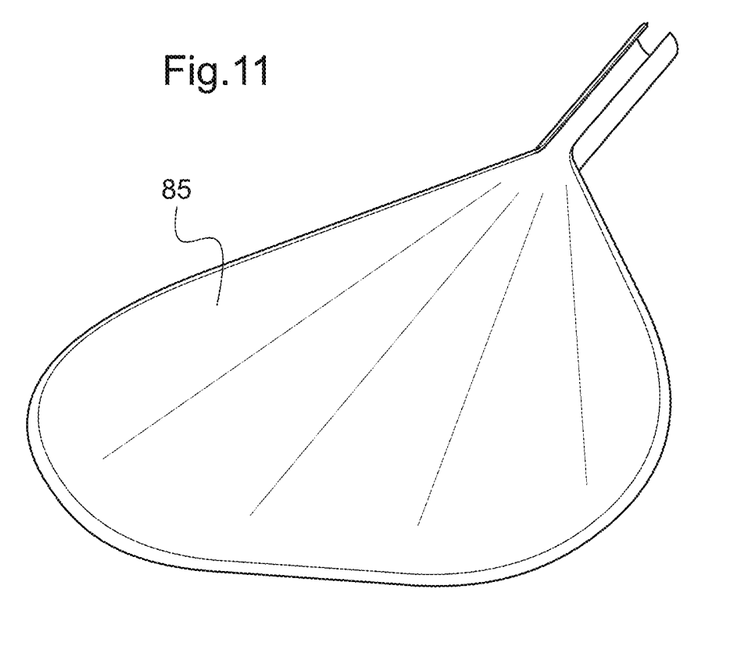
FIG. 11 is a perspective view of the removable blade of the paddle assembly according to an alternative embodiment of the present invention.

FIG. 11 shows a removable blade 85 according to one alternative embodiment of the invention.

The attachment means of the removable blade 85 have not been shown in FIG. 11 so as not to overload the drawings.

The removable blade 85 has a concavity in a direction perpendicular to the direction of its length.

Thus, the concavity of this removable blade 85 allows the practitioner to obtain a better propulsion when he rows using the paddle assembly in the double-paddle configuration.

It should be noted that, in this case, the fixed blade also has a concavity in a direction perpendicular to its length direction, such that, in the single-paddle configuration, the removable blade 85 and the fixed blade, stacked, form a single blade with concavity.

Figure 12:
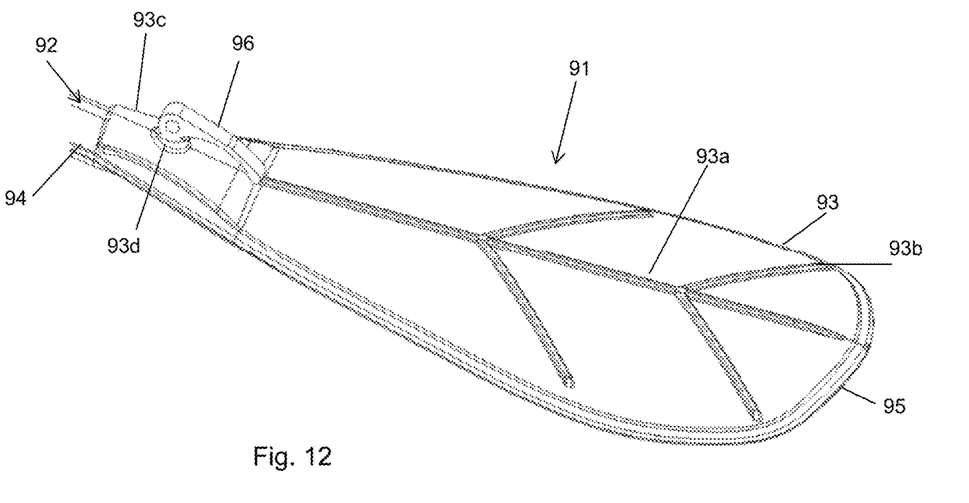
FIG. 12 is a perspective view of the removable blade and the handle of the paddle of the paddle assembly according to a sixth embodiment.
Figure 13:
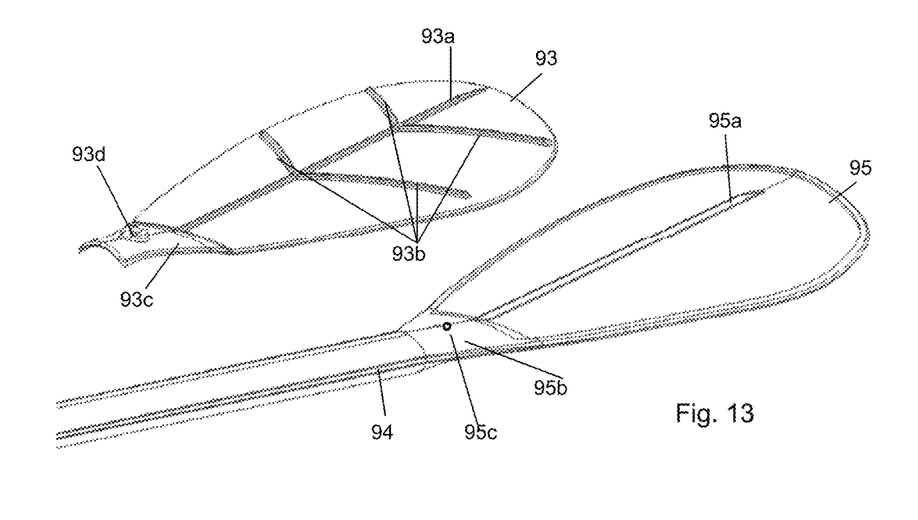
FIG. 13 is an exploded perspective view of the removable blade and the paddle according to the sixth embodiment, without the fastener.
Figure 14:
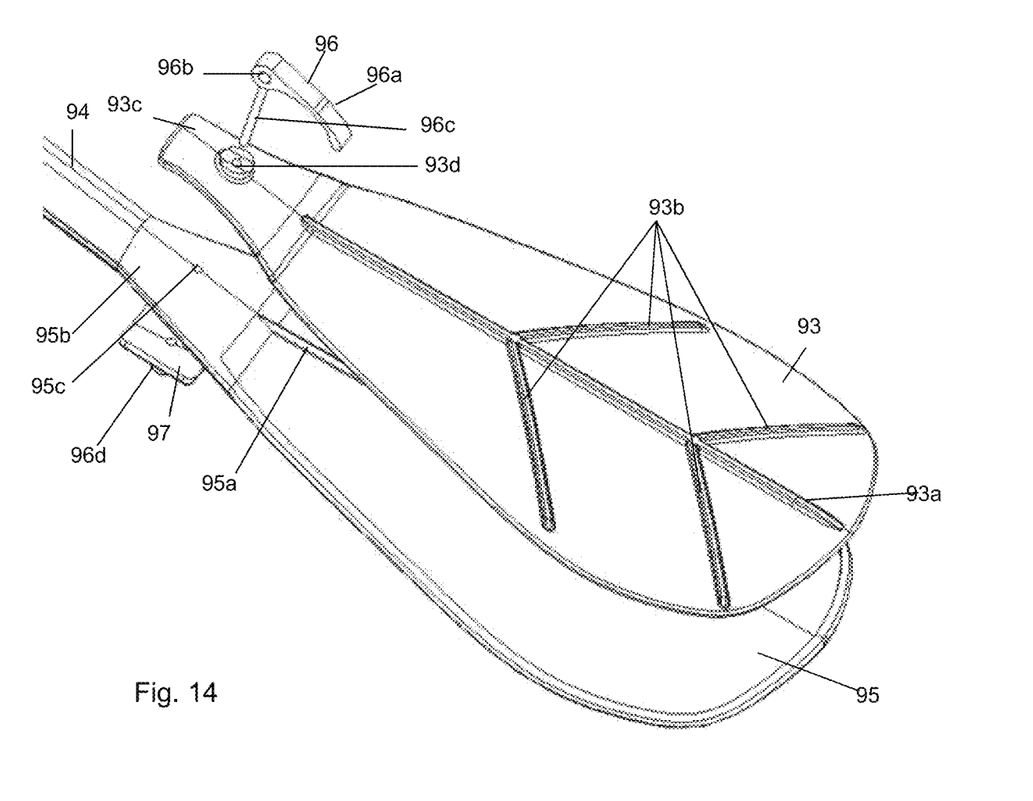
FIG. 14 is an exploded perspective view of the removable blade and the handle of the paddle of the paddle assembly according to the sixth embodiment, with the fastener.

FIGS. 12 to 14 show a paddle assembly 91 according to a sixth embodiment of the invention.

In this sixth embodiment, the paddle assembly 91 comprises a fixed blade 95 mounted at one end of the handle 94 of the paddle, and a removable blade 93, slightly smaller in size than the fixed blade 95, but with the same shape, the removable 93 and fixed 95 blades being homothetic.

In the embodiment shown in FIGS. 12 to 14, the removable 93 and fixed 95 blades have a concavity along the direction of their length and a concavity along their direction perpendicular to the direction of their length, to have an overall concavity similar to that of a spoon. Although the removable 93 and fixed 95 blades have two concavities in the illustrated embodiment, the invention is not limited in this respect. Preferably, the removable 93 and fixed 95 blades will preferably have at least the concavity along the direction of their length.

The removable blade 93 has an array of ribs intended to reinforce its rigidity, a longitudinal rib 93a and auxiliary ribs 93b extending from the longitudinal rib 93a toward the edge of the removable blade 93.

The ribs 93a, 93b are formed on the face of the removable blade 93 opposite the face intended to be adhered against the fixed blade 95, the longitudinal rib 93a corresponding to a groove on the opposite face of the removable blade 93 intended to cooperate with a corresponding longitudinal rib 95a formed on the face of the fixed blade intended to accommodate the removable blade 93.

The fixed blade 95 is attached to the handle 94 of the paddle 92 by a base 95b pierced with a hole 95c.

The removable blade 93 also has a base 93c pierced with a hole 93d, the holes 93d and 95c being intended to allow the rod 96c of a quick fastener 96 to pass, including a quick clamping lever 96a pivoting around an axis 96b, the end of the rod 96c being intended to cooperate with a nut 96d, a plate 97 or washer being able, optionally but not necessarily, to be interposed.

Figure 15:
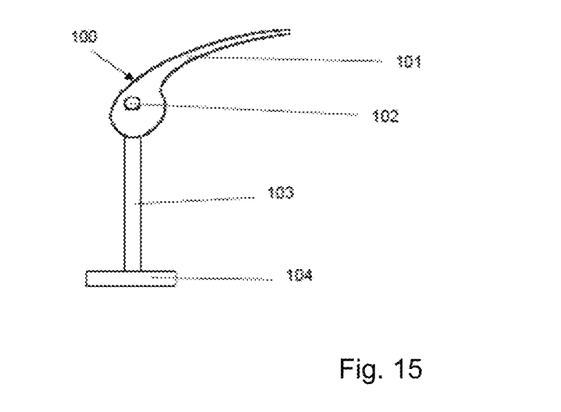
FIG. 15 is a schematic view of a quick fastener according to an embodiment of the invention.

The quick fastener may also be a quick fastener 100 integral with the rod 103 as shown in FIG. 15, the end of the rod 103 opposite that bearing the clamping lever 101 mounted on an axle 102 being a stop 104 for forming a T with the rod 103. The holes 93d and 95c are then slits making it possible to allow the stop 103 to pass. The securing is then obtained by rotating the stop 104 by 90° inserted into the holes 93d and 95c, then clamping with the quick clamping lever 101. The stop 104 perpendicular to the slit formed in the holes 93d and 95c will prevent the removable blade from moving, the quick clamping lever 101 allowing, for its part, the clamping of the assembly. The end of the rod could also be a hook or a bayonet without departing from the scope of the invention.

Thus, when the removable blade 93 is not used, it is pressed against the fixed blade 95 with its groove opposite the rib 95a of the fixed blade 95, then the quick fastener 96 makes it possible to secure the blades.

During use, a hole similar to the hole 95c is formed near the grip of the single paddle, so as to attach the removable paddle 93 on the grip to obtain a double paddle.

The attachment in this embodiment goes through the handle, whether in the single-paddle configuration or double-paddle configuration.

In this embodiment, the removable blade 93 can be attached on the concave side or the convex side of the fixed blade 95. It is necessary to have a groove of one correspond to a rib of the other on the two faces intended to cooperate, in order to guarantee good attachment.

In all of the embodiments, the removable blade, like the fixed blade, can also have a concavity in a direction parallel to their length direction and/or a concavity in a direction perpendicular to their length direction.

The removable blade and the fixed blade will preferably have a concavity in a direction parallel to their length direction, and optionally, a concavity in a direction perpendicular to their length direction.

Additionally, in all of the embodiments, the removable blade will preferably have a size slightly smaller than that of the fixed blade and the same shape, the two blades being homothetic with respect to one another, in order to be better inserted thereon.

The invention claimed is:

1. A paddle assembly comprising:
   a paddle comprising a handle;
   a fixed blade attached at one end of the paddle;
   a grip member attached at an opposite end of the paddle;
   a removable blade; and
   a fastener configured to removably attach the removable blade to the paddle on one of the end of the handle on a grip member side and the end of the handle on a fixed blade side, such that the paddle assembly is configured to adopt a first double-paddle configuration when the removable blade is attached to the end of the handle on the grip member side, or a second single-paddle configuration when the removable blade is attached to the end of the handle on the fixed blade side against the fixed blade.

2. The paddle assembly according to claim 1, wherein, in the second configuration, a concave side of the removable blade is arranged against a convex side of the fixed blade and corresponds to the shape of the convex side of the fixed blade.

3. The paddle assembly according to claim 1, wherein, in the second configuration, a convex side of the removable blade is arranged against a concave side of the fixed blade and corresponds to the shape of the concave side of the fixed blade.

4. The paddle assembly according to claim 1, wherein the fastener comprises
   a coupling device with at least one notch,
   a clamping lever comprising a hook, and
   a clamping cable connecting the coupling element and the clamping lever,
   the coupling device being attached on one of the removable blade and the handle of the paddle, the clamping lever being configured to be forcibly folded down against the handle of the paddle once the clamping cable surrounds the other of the removable blade and the handle of the paddle and the hook of the clamping lever is inserted into one of the at least one notch of the coupling device.

5. The paddle assembly according to claim 1, wherein the fastener comprises at least one hook-and-loop attachment strip arranged on one of the removable blade and the handle of the paddle.

6. The paddle assembly according to claim 1, wherein the handle of the paddle is hollow and the fastener comprises at least one spring leaf arranged in the handle of the paddle, and both ends of the spring leaf respectively bear two pins arranged to protrude from two holes formed in the handle of the paddle and diametrically opposite, the two pins thus forming two pushbuttons, the removable blade comprising two through-holes configured to receive the two pushbuttons in order to attach the removable blade on the handle of the paddle.

7. The paddle assembly according to claim 1, wherein the fastener comprises at least one coupling device arranged through the thickness of the removable blade and configured to be coupled with a complementary member arranged on the paddle.

8. The paddle assembly according to claim 7, wherein the at least one coupling device is one of a screw and a button with a threaded rod and the complementary member is a tapped hole.

9. The paddle assembly according to claim 1, wherein the fastener comprises at least one quick clamping lever arranged on the handle of the paddle and configured to be inserted into a notch formed in the removable blade, then to be gripped in order to attach the removable blade to the handle of the paddle.

10. The paddle assembly according to claim 1, wherein the fastener is a quick fastener secured to a rod, the end of the rod bearing a catch, a hole being formed in the removable blade, and a hole being formed below the grip and in the fixed blade in order to attach the removable blade to one of the grip or the fixed blade by passing the rod in the holes, and gripping of the quick fastener with the catch, which cooperate with one of the handle or the fixed blade.

11. The paddle assembly according to claim 1, wherein the fastener comprises at least one protrusion arranged in one of the removable blade and the paddle and configured to fit in at least one complementary recess arranged on the other of the removable blade and the paddle.

12. The paddle assembly according to claim 11, wherein the at least one protrusion is at least one needle configured to fit in at least one complementary recess.

13. The paddle assembly according to claim 11, wherein the at least one protrusion is at least one groove and the at least one complementary recess is at least one slit with a shape complementary to the at least one groove.

14. The paddle assembly according to claim 1, wherein the end of the removable blade intended to be fixed on the handle of the paddle is elongate and has a shape complementary to a recess formed on the handle of the paddle, such that, when the removable blade is attached on the paddle, the handle has a substantially constant section between its two ends.

15. The paddle assembly according to claim 1, wherein the handle of the paddle is adjustable in terms of height.

16. The paddle assembly according to claim 1, further comprising a leash configured to connect the removable blade to the handle of the paddle, the leash being configured to slide along the handle of the paddle.

17. The paddle assembly according to claim 1, wherein the removable blade and the fixed blade have at least one of a concavity in a direction parallel to their length direction and a concavity in a direction perpendicular to their length direction.

18. The paddle assembly according to claim 1, wherein a useful surface of the removable blade is smaller than or equal to a useful surface of the fixed blade.

19. The paddle assembly according to claim 1, wherein the grip member is in the shape of a T, the shaft of the T being secured to the handle of the paddle.

20. The paddle assembly according to claim 2, wherein the fastener comprises
a coupling device with at least one notch,
a clamping lever comprising a hook, and
a clamping cable connecting the coupling device and the clamping lever,
the coupling device being attached on one of the removable blade and the handle of the paddle, the clamping lever being configured to be forcibly folded down against the handle of the paddle once the clamping cable surrounds the other of the removable blade and the handle of the paddle and the hook of the clamping lever is inserted into one of the at least one notch of the coupling device.

* * * * *